United States Patent
Iizuka et al.

(10) Patent No.: US 8,994,952 B2
(45) Date of Patent: Mar. 31, 2015

(54) RING LASER GYRO

(71) Applicant: Japan Aviation Electronics Industry, Limited, Tokyo (JP)

(72) Inventors: Kei Iizuka, Tokyo (JP); Kazunori Yoshioka, Tokyo (JP); Naoki Yamamoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 119 days.

(21) Appl. No.: 13/967,761

(22) Filed: Aug. 15, 2013

(65) Prior Publication Data

US 2014/0300899 A1 Oct. 9, 2014

(30) Foreign Application Priority Data

Sep. 11, 2012 (JP) ................. 2012-199671

(51) Int. Cl.
*G01C 19/68* (2006.01)
*G01C 19/70* (2006.01)
*G01C 19/64* (2006.01)

(52) U.S. Cl.
CPC ............... *G01C 19/68* (2013.01); *G01C 19/70* (2013.01)
USPC ............ 356/475; 356/472; 356/476; 356/459

(58) Field of Classification Search
CPC ................. G01C 19/68; G01C 19/70
See application file for complete search history.

(56) References Cited

FOREIGN PATENT DOCUMENTS

| JP | 2007-093551 | 4/2007 |
|---|---|---|
| JP | 2008-309704 | 12/2008 |
| JP | 2010-127686 | 6/2010 |

*Primary Examiner* — Kara E Geisel
*Assistant Examiner* — Hina F Ayub
(74) *Attorney, Agent, or Firm* — Greenblum & Bernstein P.L.C.

(57) ABSTRACT

A ring laser gyro with no piezoelectric elements for dither detection includes a laser beam receiving unit for receiving a laser beam taken out of a gyro block, a laser beam intensity measuring unit for measuring the intensity of the laser beam received by the laser beam receiving unit, a dither mechanism, a dither control unit for driving the dither mechanism, and a gyro case housing the gyro block, wherein the laser beam receiving unit is secured to the gyro case, the laser beam receiving unit has a laser beam receiving surface for receiving the laser beam from the gyro block to detect a laser beam receiving position on the laser beam receiving surface and output positional information indicating the laser beam receiving position. The dither control unit drives the dither mechanism on the basis of information indicating the amplitude of the laser beam receiving position obtained from the positional information.

3 Claims, 5 Drawing Sheets

RING LASER GYRO

TECHNICAL FIELD

The present invention relates to a ring laser gyro not employing piezoelectric elements for dither detection.

BACKGROUND ART

Referring to FIG. 1, a conventional ring laser gyro will be outlined. A gyro block 11 made of glass has a triangular path 12 formed therewithin and mirrors 13, 14, 15 disposed on the apexes of the triangle formed by the path 12. The path 12 has a laser medium enclosed therewithin and anodes 16, 17 and cathode 18 disposed on the sides of the path 12. When a high voltage is applied across the anodes 16, 17 and cathode 18, the laser medium is excited and clockwise and counterclockwise laser beams oscillate. The clockwise and counterclockwise laser beams reflect off the mirrors 13, 14, 15 and propagate through the path 12 in a triangular ring shape. The optical paths of the laser beams will be referred to hereinafter as ring-shaped optical paths.

If an angular velocity is input into the gyro block 11 in this state, a difference arises between the optical path lengths of the laser beams that propagate in mutually opposite directions (clockwise and counterclockwise). This difference between the optical path lengths causes an oscillation frequency difference between the laser beams. Superposing the clockwise and counterclockwise laser beams on each other produces an interference pattern from which an angular velocity can be detected.

To this end, the laser beams are taken out through the mirror 13 which is semitransparent and serves as the readout mirror. In FIG. 1, reference numeral 21 denotes a photosensor for detecting the interference pattern (interference light), reference numeral 22 denotes a prism for refracting the optical path of one of the laser beams to form the interference pattern with the other laser beam. Reference numeral 23 denotes a laser beam intensity detector for measuring the intensity of one of the laser beams (i.e., beam intensity), which has been taken out through the mirror 13, in order to control the optical path lengths of the ring-shaped optical paths. Note that in FIG. 1 any mirror transducers are not shown which controls the optical path lengths so as to keep constant the beam intensities measured by the laser beam intensity detector 23.

Although the photosensor 21, prism 22, and laser beam intensity detector 23 are schematically shown as components separate from the gyro block 11, these components are attached to the gyro block 11 or a gyro case to which the gyro block 11 is secured.

The gyro block 11 has an opening 19 defined at the center thereof and a dither mechanism 31 attached to the opening 19 to apply vibrations in the laser beam propagating directions, i.e., vibrations about the axial center of the ring-shaped optical path, to the gyro block 11 to reduce a lock-in phenomenon.

As shown in FIG. 2, the dither mechanism 31 includes a cylindrical movable portion 32, three arm-like deforming portions 33 radially extending from its axial center to the movable portion 32, and a fixed portion 34 connected to the deforming portions 33 at the axial center and having three island-like fitting portions 34a protruding to the spaces delimited by the deforming portions 33, the deforming portions 33 having piezoelectric elements 35 bonded to both side surfaces thereof.

Out of the three pairs of (i.e., six) piezoelectric elements 35 attached to the three deforming portions 33, two pairs are used to drive the dither mechanism 31 and the remaining one pair is used to detect dithers. The fitting portions 34a have counterbored holes 34b formed therein to receive screws for securing the ring laser gyro equipped with the dither mechanism 31 to the gyro case, for example.

A dither control unit 43 drives and controls the dither mechanism 31 so as to apply vibrations to the gyro block 11 to keep constant the amplitude of the electric signal (referred to hereinafter as the dither pick-off signal) obtained through the piezoelectric elements for dither detection. The dither pick-off signal is also input to a bias signal eliminating unit 42.

Information (such as the direction and speed of movement) of the interference pattern detected by the photosensor 21 is input to a signal processing unit 41 and converted into angular velocity information. The angular velocity information output by the signal processing unit 41 is input to the bias signal eliminating unit 42.

The bias signal eliminating unit 42 uses the dither pick-off signal to eliminate from the angular velocity information a vibrational angular velocity signal corresponding to the dither vibration applied in the laser beam propagating direction and outputs the resultant signal as an angular velocity signal. This angular velocity signal represents the angular velocity of a moving apparatus equipped with the ring laser gyro.

This type of ring laser gyro is disclosed in Japanese Patent Application Laid Open Nos. 2010-127686, 2008-309704, and 2007-93551.

SUMMARY OF THE INVENTION

In the ring laser gyros having the structure as described above, disturbances such as temperature variations of the dither mechanism distort the piezoelectric elements for dither detection and affect the detected voltages, thereby degrading the accuracy of the angular velocity signals.

An object of the present invention is to provide a ring laser gyro not employing piezoelectric elements for dither detection.

A ring laser gyro according to the present invention includes a laser beam receiver which receives a laser beam taken out of a gyro block for oscillating laser beams, a laser beam intensity measuring unit which measures intensity of the laser beam received by the laser beam receiver, a dither mechanism for applying vibrations in the laser beam propagating directions to the gyro block, a dither controller which drives the dither mechanism, and a gyro case housing the gyro block, wherein the laser beam receiver is secured to the gyro case and has a laser beam receiving surface for receiving the laser beam from the gyro block, the laser beam receiver detects a position at which the laser beam from the gyro block is received (referred to hereinafter as laser beam receiving position) on the laser beam receiving surface and outputs positional information indicating the laser beam receiving position, and the dither controller drives the dither mechanism on the basis of the amplitude of the laser beam receiving position obtained from the positional information.

The laser beam receiver may be configured to output at least two current values or at least two voltage values as the positional information.

The laser beam intensity measuring unit may measure the intensity of the laser beam by adding up the current or voltage values.

Effects of the Invention

According to the present invention, the laser beam receiver secured to the gyro case detects a laser beam receiving position on the laser beam receiving surface and outputs positional information indicating the laser beam receiving position and the dither controller drives the dither mechanism on the basis of the amplitude of the laser beam receiving position obtained from the positional information. In other words, in the present invention, the dither mechanism is driven and controlled without using piezoelectric elements for dither detection. Since disturbances such as temperature variations of the dither mechanism do not affect the piezoelectric elements for dither detection, the accuracy of the angular velocity signal is not degraded.

DETAILED DESCRIPTION OF THE EMBODIMENTS

Figure 1:
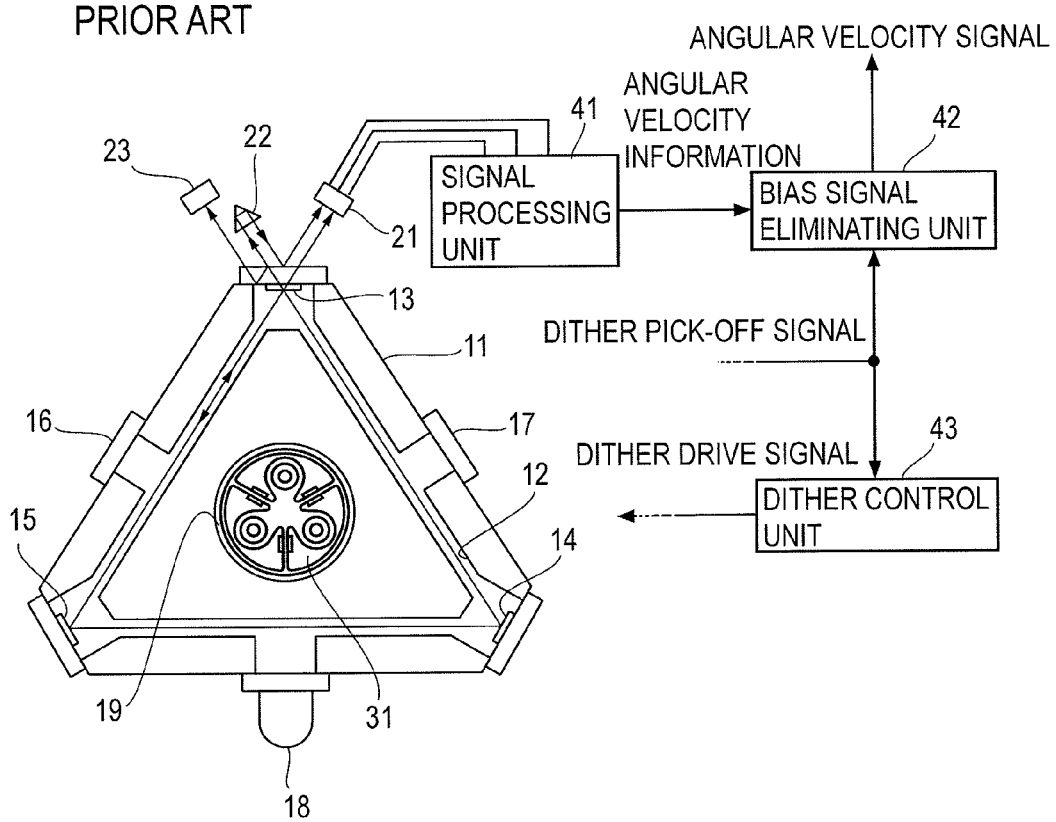
FIG. 1 shows an exemplary configuration of a conventional ring laser gyro.
Figure 2:
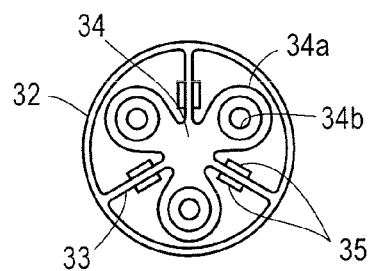
FIG. 2 is a plan view of a dither mechanism.

Referring now to the drawings, an embodiment of the present invention will be described. Here, differences between the embodiment of the present invention and the prior art will be described without duplicating the description of components common to the prior art which are denoted by the same reference numerals.

Figure 3:
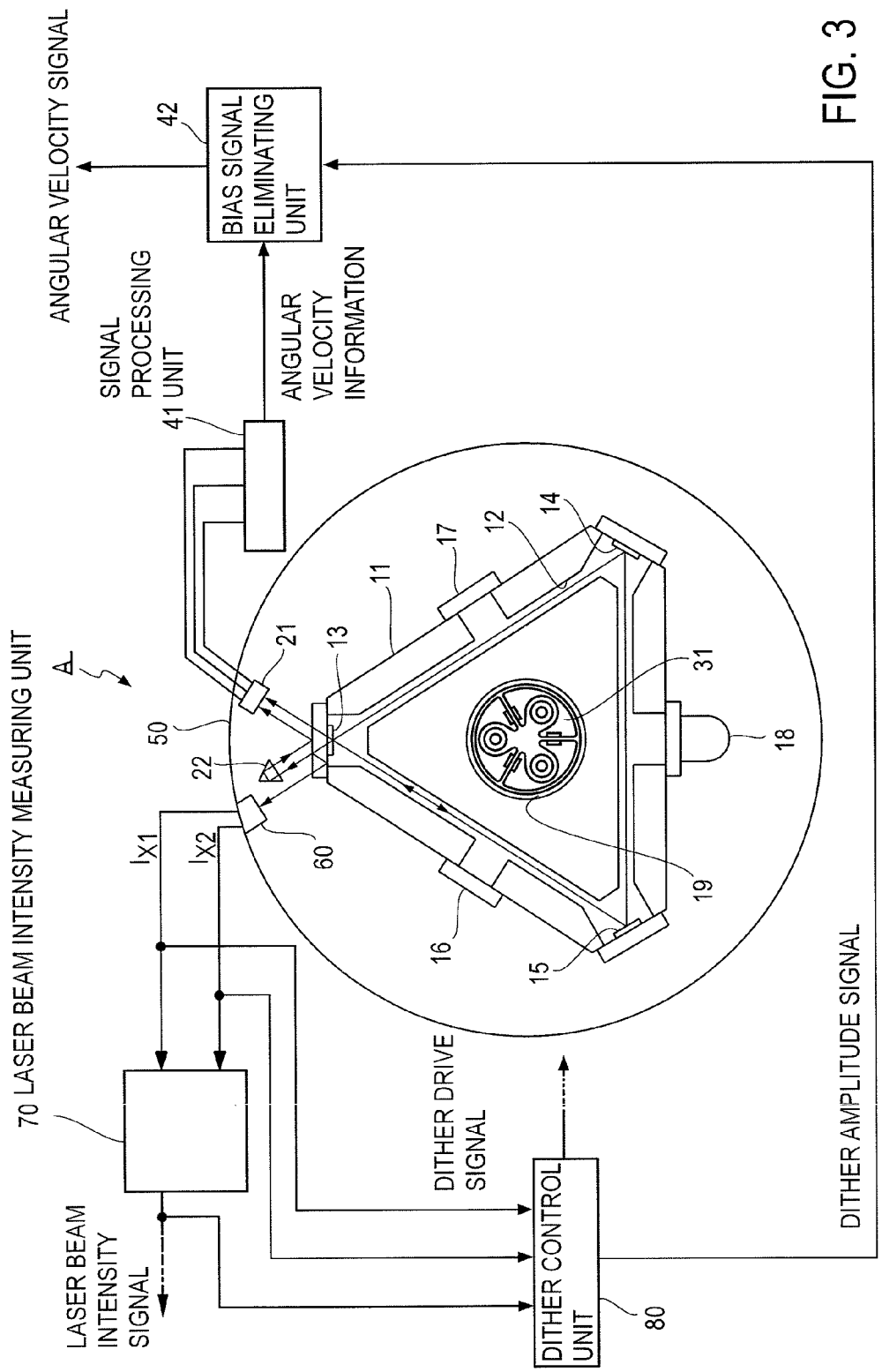
FIG. 3 shows an exemplary configuration of a ring laser gyro according to an embodiment.

A ring laser gyro A in the embodiment shown in FIG. 3 includes, instead of the laser beam intensity detector 23 provided in conventional ring laser gyros, a laser beam receiving unit 60 for receiving one of the laser beams taken out of a gyro block 11 for oscillating laser beams and a laser beam intensity measuring unit 70 for measuring the intensity of the laser beam received by the laser beam receiving unit 60. The laser beam receiving unit 60 is secured to a gyro case 50 housing the gyro block 11. The ring laser gyro A also includes a dither control unit 80, instead of the dither control unit 43 provided in the conventional ring laser gyros.

The laser beam receiving unit 60 has a laser beam receiving surface 61 for receiving the laser beams from the gyro block 11 to detect a laser beam receiving position on the laser beam receiving surface 61 and output information indicating the laser beam receiving position (referred to hereinafter as positional information). The laser beam receiving unit 60 outputs the positional information as an analog signal, for example. Laser beams are taken out of the gyro block 11 through a semitransparent mirror 13 serving as the readout mirror. One of the laser beams taken out of the gyro block 11 through the mirror 13 may directly be applied to the laser beam receiving surface 61 in the laser beam receiving unit 60 or may be refracted by a prism before being applied to the laser beam receiving surface 61 in the laser beam receiving unit 60.

Since the dither mechanism 31 applies vibrations in the laser beam propagating direction to the gyro block 11, the laser beam receiving position on the laser beam receiving surface 61 reciprocates with time. According to this embodiment, the amplitude of this reciprocation is determined and the dither mechanism 31 is driven and controlled such that vibrations are applied to the gyro block 11 to keep this amplitude constant.

A complementary metal oxide semiconductor (CMOS) image sensor, charge coupled device (CCD) image sensor, or position sensitive detector (PSD) may be employed as the laser beam receiving unit 60. The PSD outputs positional information of the laser beam receiving position making use of the surface resistance of the photodiode. In this embodiment, the laser beam receiving unit 60 is formed from PSD.

Figure 4:
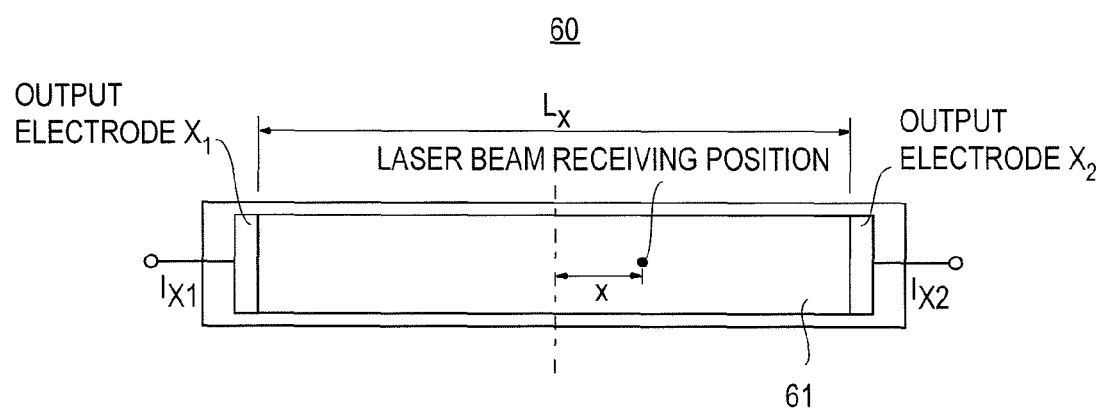
FIG. 4 is a plan view of a PSD as an exemplary laser beam receiving unit.

The laser beam receiving unit 60 formed from PSD outputs at least two current values or at least two voltage values as the positional information. FIG. 4 is a plan view showing an exemplary PSD that outputs two current values $I_{X1}$, $I_{X2}$ as one-dimensional positional information. The photoelectric currents $I_{X1}$, $I_{X2}$ corresponding to the laser beam receiving position is output from two output electrodes X1, X2 with respect to the position of a common electrode (not shown) as the origin. For example, a distance x from the origin to a laser beam receiving position is given by a formula $x=L_X(I_{X2}-I_{X1})/2(I_{X2}+I_{X1})$, where $L_X$ is the width of the rectangular laser beam receiving surface 61 (i.e., the length in the direction of the rectilinear reciprocation trace drawn by the laser beam applied to the laser beam receiving surface 61, which is the length in the direction of reciprocation of the laser beam receiving position). In this example, it is specified that the distance x is represented by a positive value when the laser beam receiving position is located toward the output electrode X2 rather than the origin.

The laser beam intensity measuring unit 70 measures the intensity of the laser beam received by the laser beam receiving unit 60 and outputs a laser beam intensity signal. For example, the laser beam intensity measuring unit 70 measures the laser beam intensity by adding up signals (e.g., current values or voltage values; photoelectric currents $I_{X1}$, $I_{X2}$ in the example shown) output by the laser beam receiving unit 60. More specifically, the laser beam intensity measuring unit 70 adds up the signals output by the laser beam receiving unit 60 and outputs the resultant signal as the laser beam intensity signal. The signals to be added up are not limited to the current values or voltage values output by the laser beam receiving unit 60; they may be the amplified values of these current values or voltage values, or the voltage values $V_{X1}$, $V_{X2}$ converted from the photoelectric currents $I_{X1}$, $I_{X2}$, as described later.

The positional information output by the laser beam receiving unit 60, i.e., signals output by the laser beam receiving unit 60, is input to the dither control unit 80. From this positional information, the dither control unit 80 determines information indicating the amplitude of reciprocation of the laser beam receiving position and outputs a dither drive signal for driving the dither mechanism 31 on the basis of this information.

Figure 5:
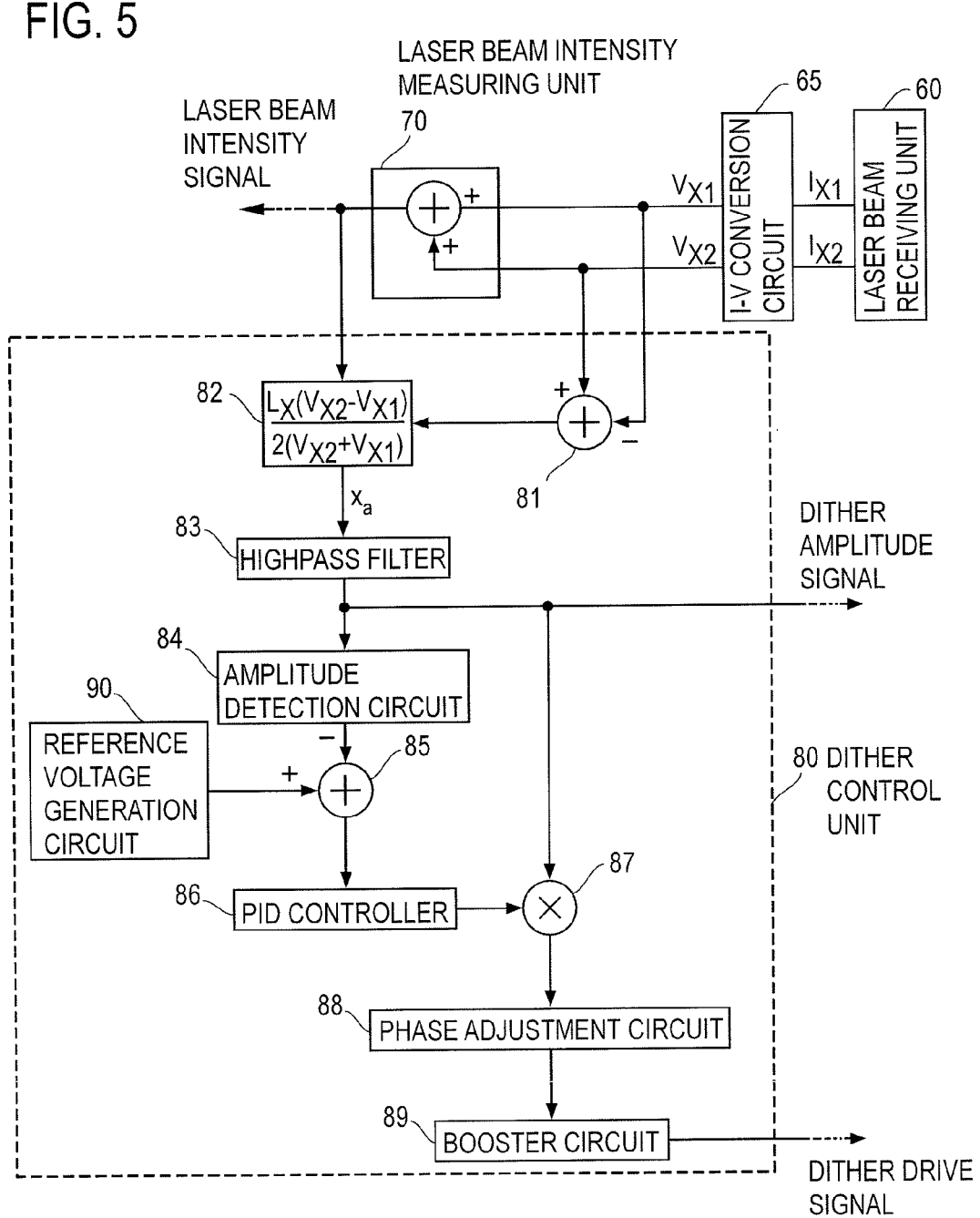
FIG. 5 shows an exemplary configuration of the dither control unit included in this embodiment.

An exemplary configuration of the dither control unit 80 is shown in FIG. 5. When the laser beam receiving unit 60 outputs photoelectric currents $I_{X1}$, $I_{X2}$, these photoelectric currents $I_{X1}$, $I_{X2}$ are converted to voltage values $V_{X1}$, $V_{X2}$ by an I-V conversion circuit 65 before being input to the laser beam intensity measuring unit 70 and dither control unit 80. When the laser beam receiving unit 60 outputs voltages, the I-V conversion circuit 65 is not necessary. The laser beam intensity measuring unit 70 outputs the result of adding up the voltage values $V_{X1}$ and $V_{X2}$ as the laser beam intensity signal. This laser beam intensity signal is input to a mirror control unit (not shown) and the dither control unit 80. Then, the mirror control unit controls the optical path lengths of the ring-shaped optical paths by driving the mirrors 14, 15 so as to keep the beam intensity constant.

In the dither control unit 80, a subtractor 81 outputs the result of subtracting the voltage value $V_{X1}$ from the voltage value $V_{X2}$ and a displacement calculator 82 computes a formula $x_a L_X (V_{X2} - V_{X1})/2(V_{X2} + V_{X1})$ using the subtraction result from the subtractor 81 and the addition result from the laser beam intensity measuring unit 70 and outputs a signal indicating a displacement $x_a$. The signal indicating the displacement $x_a$ is passed through a highpass filter 83 and an output from the highpass filter 83 is input to an amplitude detection circuit 84. This signal having passed through the highpass filter 83 is also input to a bias signal eliminating unit 42 as the dither amplitude signal, instead of the conventional dither pick-off signal. On the basis of the range of variation of the input values, the amplitude detection circuit 84 outputs a signal indicating the amplitude of reciprocation of the laser beam receiving position. The subtractor 85 subtracts the output of the amplitude detection circuit 84 from the reference value output by a reference voltage generation circuit 90, and this subtraction result is input to a PID controller 86 (PID: Proportional Integral Derivative). On the basis of the subtraction result, the PID controller 86 carries out feedback control of the output of the highpass filter 83 so as to keep constant the amplitude of reciprocation. A multiplier 87 outputs the result of multiplying the output of the PID controller 86 with the output of the highpass filter 83. The output of the multiplier 87 is subjected to phase adjustment by a phase adjustment circuit 88 and then boosted by a booster circuit 89 into a dither drive signal. This dither drive signal is supplied to piezoelectric elements 35 for driving the dither mechanism 31. The bias signal eliminating unit 42 uses the dither amplitude signal to eliminate from the angular velocity information the vibrational angular velocity signal corresponding to the dither vibrations applied in the laser beam propagating direction and outputs the resultant signal as the angular velocity signal.

Figure 6:
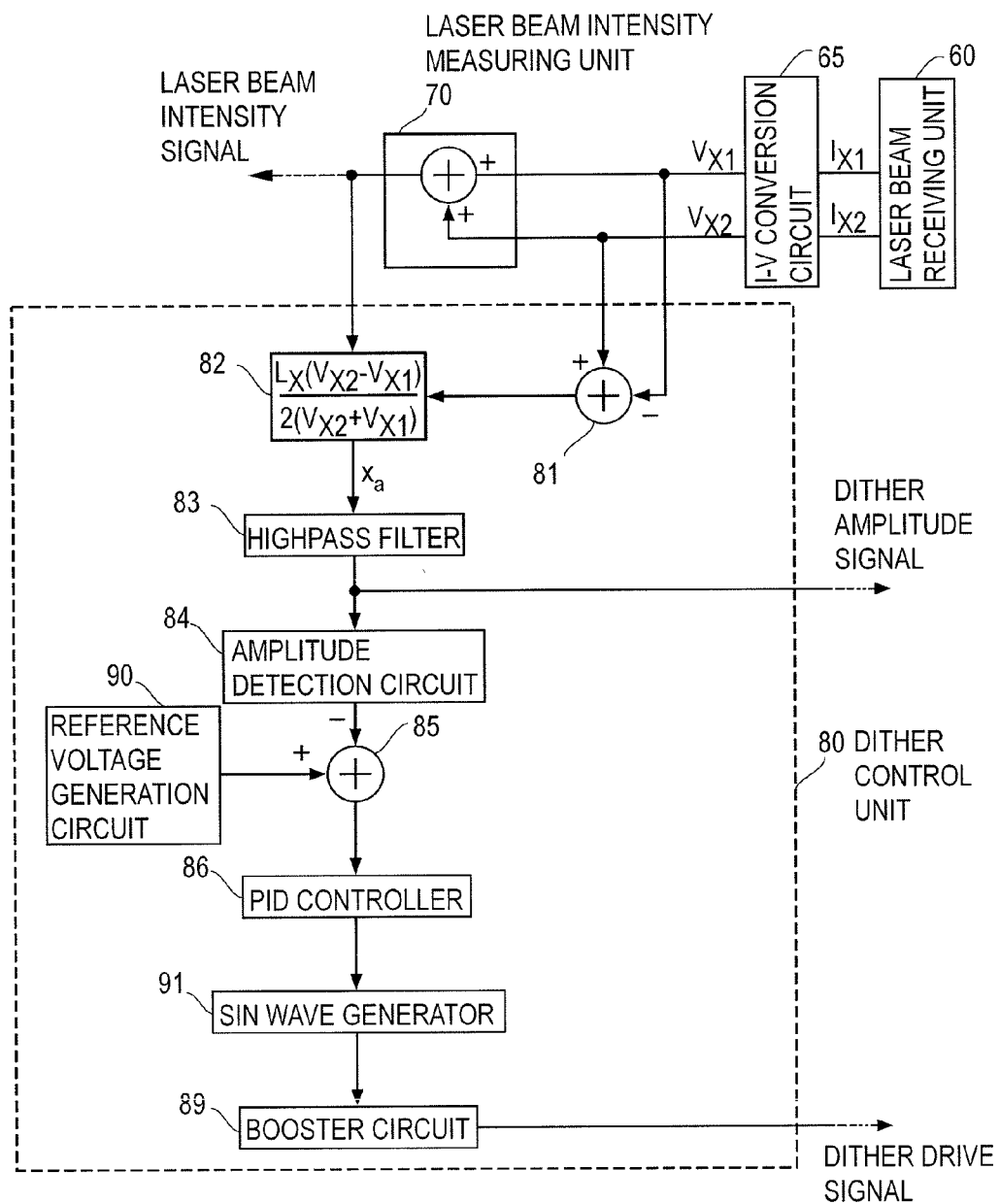
FIG. 6 shows another exemplary configuration of the dither control unit included in this embodiment.

Another exemplary configuration of the dither control unit 80 is shown in FIG. 6. When the laser beam receiving unit 60 outputs photoelectric currents $I_{X1}$, $I_{X2}$, these photoelectric currents $I_{X1}$, $I_{X2}$ are convened to voltage values $V_{X1}$, $V_{X2}$ by an I-V conversion circuit 65 before being input to the laser beam intensity measuring unit 70 and dither control unit 80. When the laser beam receiving unit 60 outputs voltages, the I-V conversion circuit 65 is not necessary. The laser beam intensity measuring unit 70 outputs the result of adding up the voltage values $V_{X1}$ and $V_{X2}$ as the laser beam intensity signal. This laser beam intensity signal is input to a mirror control unit (not shown) and the dither control unit 80. Then, the mirror control unit controls the optical path lengths of the ring-shaped optical paths by driving the mirrors 14, 15 so as to keep constant the beam intensity.

In the dither control unit 80, the subtractor 81 outputs the result of subtracting the voltage value $V_{X1}$ from the voltage value $V_{X2}$ and the displacement calculator 82 calculates the formula $x_a = L_X(V_{X2} - V_{X1})/2(V_{X2} + V_{X1})$ using the subtraction result obtained by the subtractor 81 and the addition result obtained by the laser beam intensity measuring unit 70 and outputs a signal indicating a displacement $x_a$. The signal indicating the displacement $x_a$ is passed through the highpass filter 83 and an output from the highpass filter 83 is input to the amplitude detection circuit 84. This signal having passed through the highpass filter 83 is also input to the bias signal eliminating unit 42 as the dither amplitude signal, instead of the conventional dither pick-off signal. On the basis of the range of variation of the input values, the amplitude detection circuit 84 outputs a signal indicating the amplitude of reciprocation of the laser beam receiving position. The subtractor 85 subtracts the output of the amplitude detection circuit 84 from the reference value output by a reference voltage generation circuit 90, and the subtraction result is input to a PID controller 86. On the basis of the subtraction result, the PID controller 86 carries out feedback control of a sine wave generator 91 so as to keep constant the amplitude of reciprocation. On the basis of the output of the PID controller 86, the sine wave generator 91 outputs a sine wave signal having a predetermined amplitude. This sine wave signal is boosted by the booster circuit 89 into a dither drive signal. This dither drive signal is supplied to the piezoelectric elements 35 for driving the dither mechanism 31. The bias signal eliminating unit 42 uses the dither amplitude signal to eliminate from the angular velocity information the vibration angular velocity signal corresponding to the dither vibrations applied in the laser beam propagating direction and outputs the resultant signal as the angular velocity signal.

According to the configuration in this embodiment, vibrations applied by the dither mechanism 31 to the gyro block 11 are measured on the basis of the changes of the laser beam receiving position on the laser beam receiving surface 61 of the laser beam receiving unit 60 irradiated by the laser beam taken out of the gyro block 11 (i.e., laser beam receiving position on the laser beam receiving surface 61) without using piezoelectric elements vulnerable to the influences of temperature variations of the dither mechanism 31 or the like. The changes of the laser beam receiving position exactly reflect the actual vibrations applied by the dither mechanism 31 to the gyro block 11. The laser beam receiving unit 60 is secured to the gyro case 50 that is unaffected by the vibrations applied by the dither mechanism 31. According to the configuration in this embodiment, the actual vibrations applied by the dither mechanism 31 to the gyro block 11 can be measured with high accuracy. Since the vibrational angular velocity corresponding to the vibrations applied by the dither mechanism 31 can accurately be measured and eliminated from the angular velocity information that is obtained by processing information (direction and speed of movement) of the interference pattern detected by the photosensor 21, the output accuracy of the ring laser gyro is increased.

In the conventional dither mechanism 31, at least one pair out of a plurality of pairs of piezoelectric elements 35 was used for dither detection. It was necessary, therefore, to apply a high voltage to the remaining piezoelectric elements to drive the dither mechanism 31 as desired. In contrast, according to this embodiment, which does not employ piezoelectric elements for dither detection, all the piezoelectric elements can be used for driving the dither mechanism 31. This allows the voltage applied to each piezoelectric element to be set lower than in the conventional ring laser gyros and the size of the power supply circuit for driving the dither mechanism 31 to be reduced, thereby enabling the cost reduction of the power supply circuit.

In the conventional ring laser gyros, the piezoelectric elements for dither detection were configured independently from the laser beam intensity measuring structure. In contrast, according to this embodiment, the output of the laser beam receiving unit 60 is used for both the dither detection and the laser beam intensity measurement. When two pairs of piezoelectric elements are used to drive the dither mechanism 31 as in the conventional ring laser gyros, the piezoelectric elements for dither detection become unnecessary, thereby decreasing the number of components compared with the conventional ring laser gyros. This also leads to the reduction in failure rate and cost of the ring laser gyros.

The present invention is not limited to the above embodiment; it can be modified as appropriate without departing from the idea and scope of the present invention.

What is claimed is:

1. A ring laser gyro comprising:
   a laser beam receiver which receives a laser beam taken out of a gyro block for oscillating laser beams;
   a laser beam intensity measuring unit which measures intensity of the laser beam received by the laser beam receiver;
   a dither mechanism for applying vibrations in laser beam propagating directions to the gyro block;
   a dither controller which drives the dither mechanism; and
   a gyro case housing the gyro block;
   wherein the laser beam receiver is secured to the gyro case;
   the laser beam receiver has a laser beam receiving surface for receiving the laser beam from the gyro block and outputs positional information indicating a laser beam receiving position by detecting the laser beam receiving position on the laser beam receiving surface; and
   the dither controller drives the dither mechanism on the basis of an amplitude of the laser beam receiving position obtained from the positional information.

2. The ring laser gyro according to claim 1,
   wherein the laser beam receiver outputs at least two current values or at least two voltage values as the positional information.

3. The ring laser gyro according to claim 2,
   wherein the laser beam intensity measuring unit measures the intensity of the laser beam by adding up the current values or the voltage values.

* * * * *